UNITED STATES PATENT OFFICE.

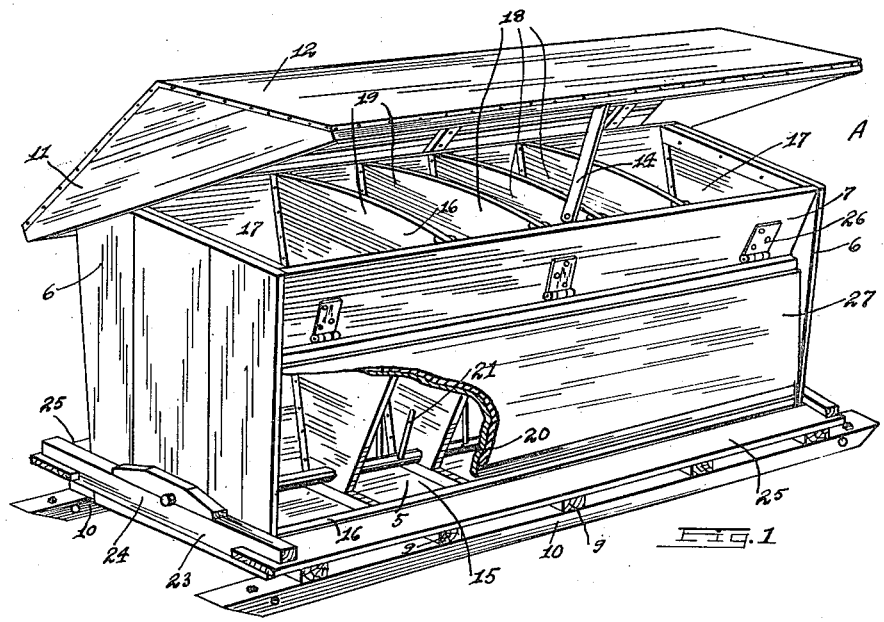
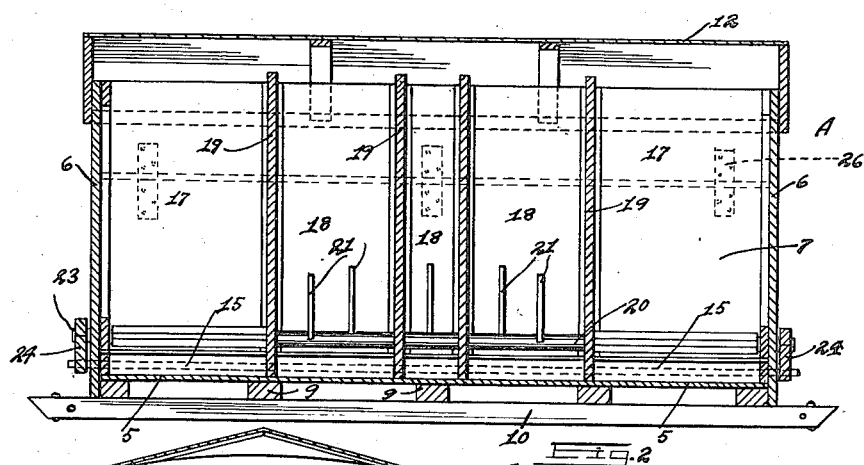
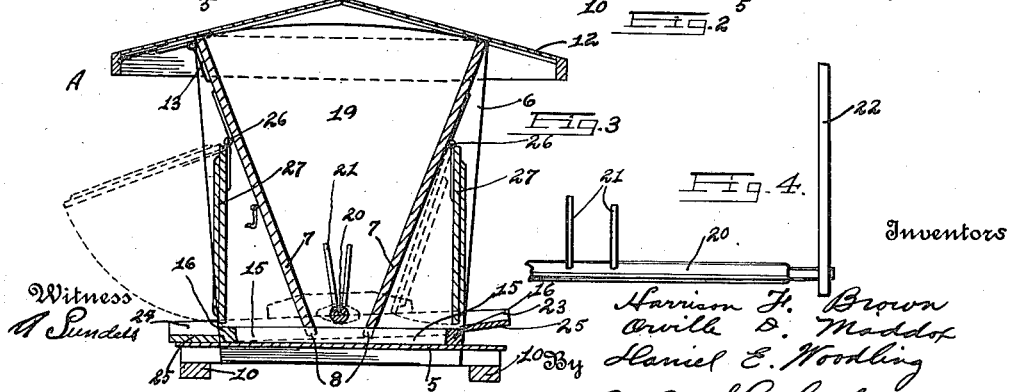

HARRISON F. BROWN, ORVILLE D. MADDUX, AND DANIEL E. WOODLING, OF WASHINGTON COURT-HOUSE, OHIO.

SWINE-FEEDING DEVICE.

1,283,464.　　　　　Specification of Letters Patent.　　Patented Nov. 5, 1918.

Application filed September 26, 1917. Serial No. 193,250.

*To all whom it may concern:*

Be it known that we, HARRISON F. BROWN, ORVILLE D. MADDUX, and DANIEL E. WOODLING, citizens of the United States, residing at Washington Court-House, in the county of Fayette and State of Ohio, have invented certain new and useful Improvements in Swine-Feeding Devices, of which the following is a specification.

This invention relates to improvements in swine feeding devices and has for its main object the provision of a structure wherein the swine themselves automatically operate an agitator from either side of the device. To this end, our invention resides essentially in the combination of a hopper formed to include downwardly converging side walls and a feed trough disposed beneath the walls and extending laterally beyond its lower edges, together with an agitator and means disposed on both sides of the hopper and connected to the agitator so that a preponderance of weight on either side of the feeder will act to oscillate the agitator to that side thereby causing an automatic flow of feed should the same become clogged within the hopper.

Other objects will be in part obvious and in part pointed out hereinafter.

For a further disclosure of the invention, reference is to be had to the following description and to the accompanying drawing, forming a part of this specification, and in which:

Figure 1 is a perspective view of the swine feeder, showing the roof or cover thereof in an elevated position, parts of the feeder being shown in section.

Fig. 2 is a longitudinal sectional view taken through the hopper, disclosing the relative position of the agitator therein.

Fig. 3 is a transverse cross sectional view, illustrating by dotted lines the movement of the agitator and its coöperating frame.

Fig. 4 is a fragmentary perspective view of the agitator showing a manually operated handle carried thereby to effect its oscillation.

Similar characters of reference denote corresponding parts throughout the several views of the drawing.

Referring more particularly to the drawing, the swine feeding device, in its preferred form, consists of a grain or feed receiving hopper A, which is formed to embody a bottom 5, end walls 6, and downwardly converging side walls 7, the top of the hopper being left open, while the lower edges of the walls 7 terminate in spaced relation with regard to the bottom 5, so as to provide grain passageways 8 therebetween. The bottom 5 is supported upon parallel cross beams 9, to the lower ends of which are secured a plurality of runners 10, by means of which the feeder as a whole may be suitably drawn from place to place. The open top of the hopper is preferably covered by means of a roof 11, which is formed to include oppositely inclined surfaces 12, terminating an appreciable distance beyond the upper edges of the side walls 7, this construction being advisable in order to further protect the grain carried by the feeder from the effects of the weather. The roof is hinged, as at 13, to the hopper so that the former may be elevated, in the manner shown in Fig. 1, to facilitate the insertion of swine food therein; a brace 14 being pivotally carried by the hopper to retain the roof in its elevated position, said brace folding within the hopper when not in use.

The lower end of the hopper terminates within feeding troughs 15, in this instance disposed on both sides of the hopper, the passageways 8 establishing communication therebetween. The troughs 15 are directly mounted upon and are formed by the bottom 5, the same including side pieces 16 which are suitably spaced from the lower end of the walls 7, and are of a height considerably greater than that of the passageways 8, so as to prevent loss of food from the device. Thus it will be seen that when feed, such as milled grain or the like, is placed within the hopper, the same will gravitate into the troughs, where it will be accessible for feeding purposes. The hopper A is preferably divided into a plurality of unequally proportioned compartments 17 and 18 through the medium of transversely disposed partitions 19 and each of said compartments may receive different grades of feed. For instance, the compartments 17 may receive hog nutriment of a semi-liquid nature, while the compartments 18 are primarily utilized to receive the better grades of feed, as will be clearly understood.

In order to prevent the feed from becoming clogged in the reduced discharge end of the hopper, so as to interfere with the passage of the same into the feeding troughs, use is made of an agitating member 20, the latter being journaled within the hopper for rotary or oscillatory movement and extends longitudinally of the latter. The agitator in its preferred form, embraces a shaft like structure having radially extending fingers 21 projecting therefrom, one or more of said fingers being disposed within the central compartments 18, so as to loosen the clogged or lumped grain confined therein. Ordinarily, it is not necessary to provide these agitating fingers upon the member 20 when it passes through the compartments 17, as the matter contained within the latter is usually not of a character to require the services of the agitator.

Suitable means may be provided for rocking the said agitator, for example, a manually operated handle 22, shown in Fig. 4, but in the preferred embodiment of the invention, this is accomplished automatically by the action of the feeding swine. To this end, use is made of a frame 23, including end pieces 24 which are fixed to the outer extremities of the member 20, and said end pieces are connected by longitudinally extending bars 25, which extend parallel and adjacent to the trough side pieces 16. Thus when the swine attempt to feed from the troughs, the same will engage the bars 25, either by treading on the latter or by brushing against them, and will thereby rock the frame 23, as shown by dotted lines in Fig. 3, thus imparting simultaneous movement to the agitator and its associated fingers 21. This provides a positive flow of the grain from the compartments into said feed troughs. Due to the restless movements of the swine while feeding, the frame 23 will be intermittently oscillated so that the successful operation of the agitator will be insured; however, it is not strictly essential to the successful operation of the feeder to continue the intermittent operation of the agitator during the feeding of swine as it will be understood that several operations of the latter will prevent clogging of the grain.

To preclude the tendency of domest' fowls and the like from utilizing the contents of the troughs 15, the sloping side walls 7 of the hopper have hingedly connected therewith, as at 26, a plurality of guard plates 27. The latter are loosely suspended from their respective hinges and normally assume vertically disposed positions whereby the lower edges thereof are situated adjacent to the side pieces 16 of the troughs, so that the contents of the latter will be substantially inclosed. The weight of the plates is such that the fowls cannot oscillate the same to positions uncovering the troughs, but on the other hand, said plates will readily assume substantially parallel relation with the walls 7 by the action of the feeding swine.

Securing devices may be provided, if desired, for retaining the plates 27 in their inactive positions.

From the foregoing it will be apparent that there is provided a device wherein the objects of the present invention have been achieved, and that all the advantageous features above mentioned are, among others, present. The device is of an exceedingly compact nature and has the troughs thereof so disposed that a maximum number of swine may be fed at the same time in proportion to its general area. The same is economical to manufacture, reliable and efficient in operation, and not likely to become out of order or to occasion continuous repairs. Through the provision of the runners 10, the feeder may be readily transported to desired locations.

Having described the invention, what is claimed as new and patentable is:

1. In a feed trough, the combination with a hopper formed to include downwardly converging side walls, a feeding trough disposed beneath said walls and extending outwardly beyond the lower edges thereof, an agitator member extending longitudinally through said hopper and means disposed on both sides of said hopper and connected to said agitator so that a preponderance of weight on either side will oscillate the agitator to that side.

2. In a feed trough, the combination with a hopper formed to include downwardly converging side walls, a feeding trough disposed beneath said walls and extending outwardly beyond the lower edges thereof, an agitator member extending longitudinally through said hopper, an arm rigidly connected to each end of said agitator and projecting laterally beyond both sides of said trough, and means located on both sides of said trough connecting said arms to form a rest so that a preponderance of weight on either one of said rests will oscillate said agitator to that side.

In testimony whereof we affix our signatures in presence of two witnesses.

HARRISON F. BROWN.
ORVILLE D. MADDUX.
DANIEL E. WOODLING.

Witnesses:
STELLA D. HENDRYX,
J. D. POST.